US011120148B2

(12) United States Patent
Sreedhar et al.

(10) Patent No.: US 11,120,148 B2
(45) Date of Patent: Sep. 14, 2021

(54) DYNAMICALLY APPLYING APPLICATION SECURITY SETTINGS AND POLICIES BASED ON WORKLOAD PROPERTIES

(71) Applicant: Fortinet, Inc., Sunnyvale, CA (US)

(72) Inventors: Rajiv Sreedhar, Sunnyvale, CA (US); Ratinder Paul Singh Ahuja, Saratoga, CA (US); Manuel Nedbal, Santa Clara, CA (US); Damodar Hegde, Cupertino, CA (US); Jitendra Gaitonde, Cupertino, CA (US); Manoj Ahluwalia, San Jose, CA (US); Stuart Gibson, Seattle, WA (US)

(73) Assignee: Fortinet, Inc., Sunnyvale, CA (US)

( * ) Notice: Subject to any disclaimer, the term of this patent is extended or adjusted under 35 U.S.C. 154(b) by 398 days.

(21) Appl. No.: 16/245,242

(22) Filed: Jan. 10, 2019

(65) Prior Publication Data

US 2020/0226271 A1    Jul. 16, 2020

(51) Int. Cl.
*G06F 21/60* (2013.01)
*G06F 21/62* (2013.01)
*G06F 9/455* (2018.01)

(52) U.S. Cl.
CPC ........ *G06F 21/604* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 10,574,701 B1* | 2/2020 | Averi | H04L 63/1416 |
| 2011/0138441 A1* | 6/2011 | Neystadt | H04L 63/10 726/1 |
| 2016/0234250 A1* | 8/2016 | Ashley | H04L 63/105 |
| 2017/0279826 A1* | 9/2017 | Mohanty | H04L 63/20 |
| 2017/0359217 A1* | 12/2017 | Ahuja | H04L 67/16 |

* cited by examiner

*Primary Examiner* — Joseph P Hirl
*Assistant Examiner* — Hassan Saadoun
(74) *Attorney, Agent, or Firm* — HDC Intellectual Property Law, LLP

(57) ABSTRACT

Systems, methods, and apparatuses enable a security orchestrator to detect a virtual machine deployed in a virtual environment. The virtual machine includes a tag storing information associated with the virtual machine. The security orchestrator determines that the tag contains one or more security elements, the security elements indicating information for determining security settings and policies to be applied to the virtual machine. The security orchestrator determines the security settings and policies associated with the one or more security elements. The security orchestrator then assigns or applies the security settings and policies for the virtual machine based on values of the one or more security elements.

24 Claims, 11 Drawing Sheets

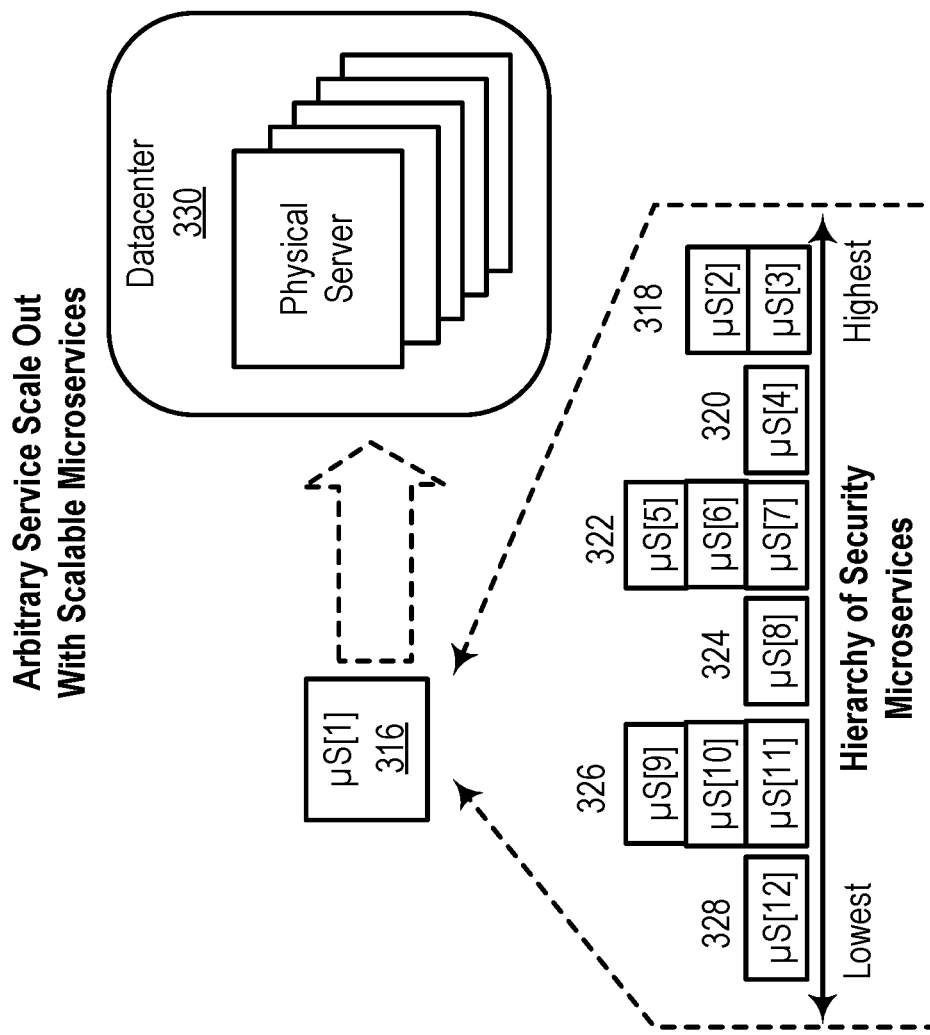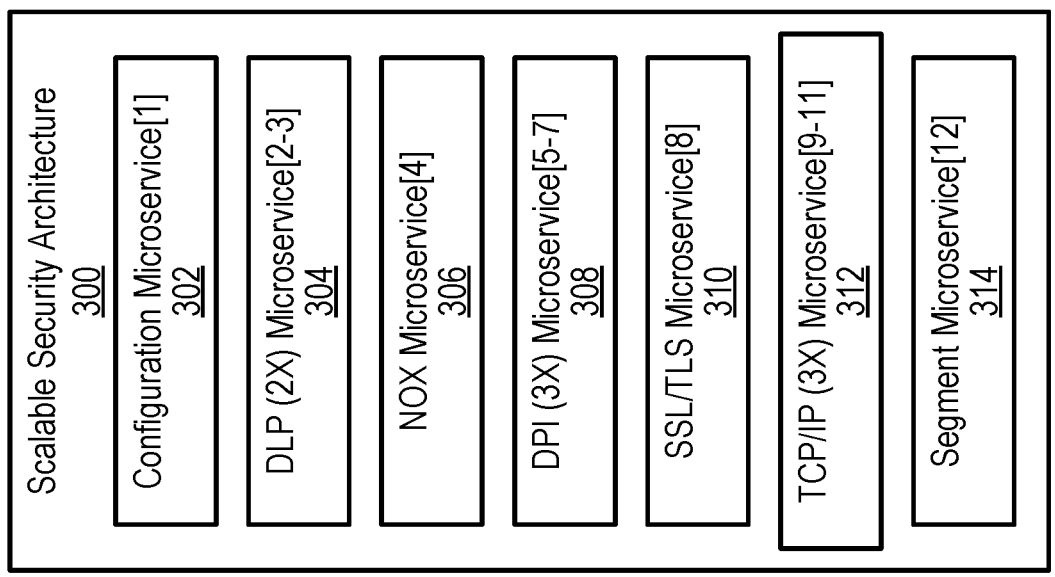
FIG. 3

DYNAMICALLY APPLYING APPLICATION SECURITY SETTINGS AND POLICIES BASED ON WORKLOAD PROPERTIES

TECHNICAL FIELD

Embodiments described herein generally relate to network security. Embodiments described herein generally relate to systems and methods for dynamically applying application security settings and policies based on workload properties.

BACKGROUND INFORMATION

Most businesses and organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

BRIEF DESCRIPTION OF THE DRAWINGS

The various advantages of the embodiments disclosed herein will become apparent to one skilled in the art by reading the following specification and appended claims, and by referencing the drawings, in which:

FIG. 3 illustrates an arbitrary scaling out of a microservice in accordance with the disclosed embodiments;

and

Figure 11:
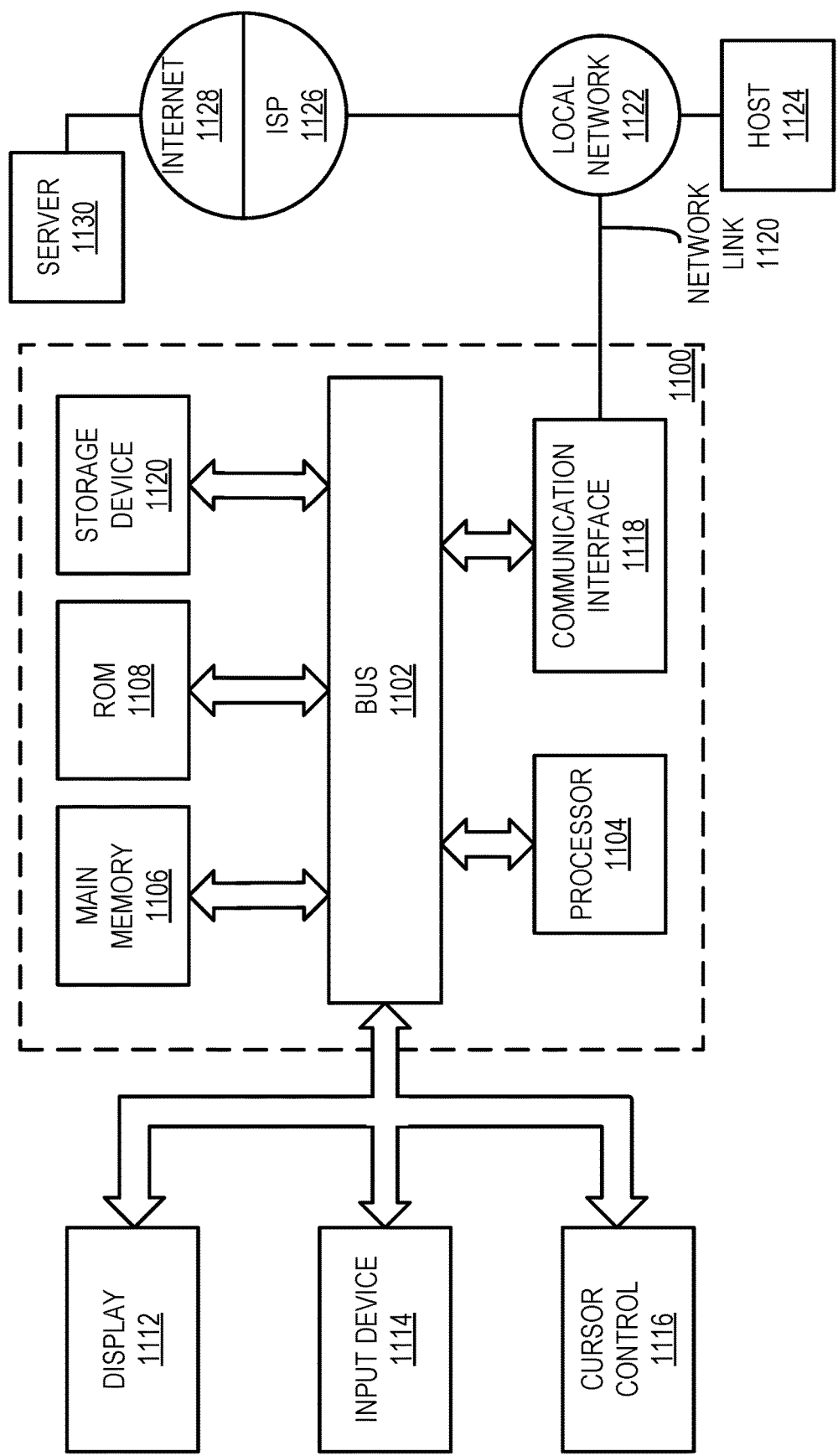

FIG. 11 is a block diagram that illustrates a computer system utilized in implementing the above-described techniques in accordance with some of the disclosed embodiments.

DETAILED DESCRIPTION

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In order to dynamically apply application security settings and policies, a security system utilizing a plurality of security microservices can be implemented. In conventional systems, security settings and policies are applied based on a virtual machines IP address, network connectivity, operating system and patch levels, application stack and related factors. The policies are defined in terms of sets of rules (incorporating allowable and prohibited actions based on such factors) that must be customized for the application and environment. Determining which policy to apply (including exceptions for each virtual machine) involves discovery, monitoring and processing by the orchestration layer and is subject to continual maintenance as policies evolve and the operations of the virtual machines change.

To address the deficiencies of existing security infrastructures, embodiments detailed herein use security elements contained in a tag associated with a workload (e.g., a virtual machine) to dynamically apply application security settings and policies. Embodiments apply security settings and policies to the virtual machine that can be applied to or enforced upon network traffic from virtual machines, without the application owner or user (e.g., a non-administrative person interacting with the application) having to know details about specific aspects of the security settings and policies or the virtual machines, including where the virtual machine is located and how the virtual machine is connected. Such embodiments reduce the amount of time required to determine and generate security settings and policies as it can be performed dynamically without any interaction by the application owner or user. For example, an application owner or user can describe the virtual machine by tagging the virtual machine in terms understood by and relevant to the application owner (security elements) and have the appropriate security settings and policies enforced based on this description without further involvement.

For example, some embodiments detailed herein utilize a security orchestrator to detect virtual machine deployed in a virtual environment. The virtual machine includes a tag storing information associated with the virtual machine. The security orchestrator determines that the tag contains one or more security elements, the security elements indicating information for determining security settings and policies to be applied to the virtual machine. The security orchestrator determines the security settings and policies associated with the one or more security elements. The security orchestrator then automatically assigns or applies the security settings and policies for the virtual machine based on values of the one or more security elements.

Figure 1:
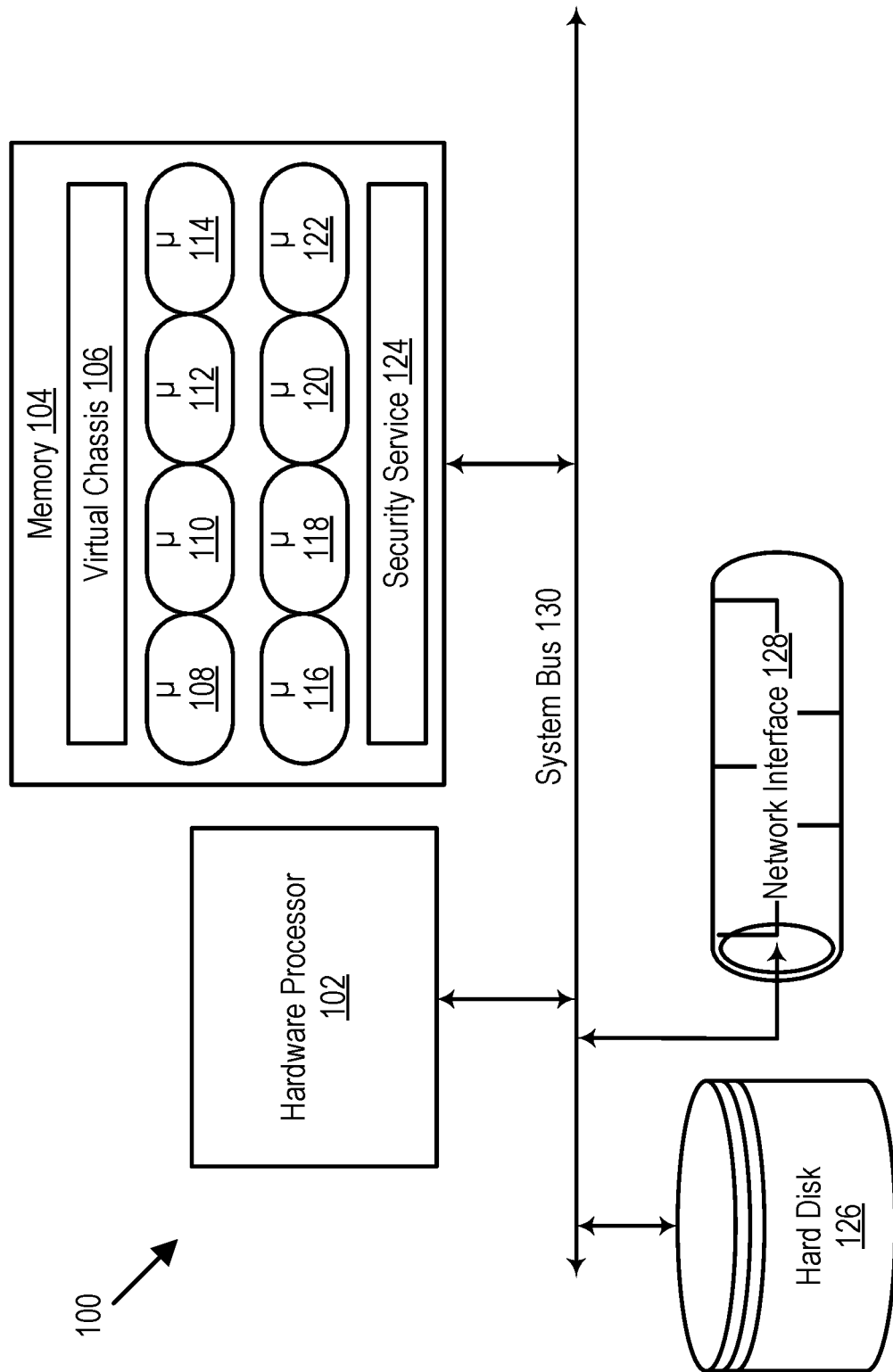
FIG. 1 is a block diagram of a network security system illustrating computer hardware, including a memory and processor, in accordance with the disclosed embodiments.

FIG. 1 is a block diagram of network security system 100 illustrating computer hardware, including a memory (e.g., 104) and processor (e.g., 102), in accordance with the disclosed embodiments. Network security system 100 further includes a hard disk (e.g., 126) and network interface 128. In one embodiment, hardware processor 102, memory 104, hard disk 126, and network interface 128 are coupled to each other via a system bus (e.g., 130). Network security microservices 108-122 are stored in memory 104 (e.g., volatile memory such as Random-Access Memory (RAM) and/or non-volatile memory such as solid-state storage or disk) and executed by one or more processor cores or hardware processor 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, network security system 100 utilizes hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security service 124, etc.) stored in memory 104. Network interface 128 (e.g., fabric or interconnect that is wired or wireless) provides a means for communicating with a data center. Network security system 100 may inspect traffic, detect threats, generate security settings and policies (e.g., access control lists), and otherwise protect a data center using the microservices 108-122.

Embodiments of network security system 100 providing the above capabilities are now discussed in more detail. Network security system 100 adds security to, or enhances the security of, a datacenter or other computing environment. In one embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, network security system 100 utilizes a network interface 128 to explore the datacenter and to discover existing network segments, determine security settings and policies to apply to various network segments, detect available hosts and hardware resources, and determine additional configuration information as needed. In one embodiment, the datacenter itself includes several machines with hypervisors, or physical hardware, and the network security system 100 offers microservices to communicate with and protect one or more of those internal virtual machines or physical hardware. Based on performing datacenter discovery, network security system 100, in some embodiments, may then offer or suggest available security tools for selection either through a graphical interface or via connections with existing enterprise management software. In one embodiment, once configured, network security system 100 is deployed "in-line," receiving packets headed for the datacenter, thereby allowing network security system to intercept and block suspicious traffic before it reaches the datacenter. With an understanding of the datacenter, network security system 100 deploys microservices to inspect traffic throughout the datacenter, and not only at ingress. In some embodiments, network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In one embodiment, the microservices are small in size, consisting of a relatively small number of instructions. In one embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security service 124. Security service 124 is configured to utilize a plurality of microservices to manage the initialization of other security microservices on a computing device (e.g., servers) to prevent potentially bad or malicious network traffic from being transmitted from an untrusted network (e.g., the internet) to trusted network resources, and between trusted network resources. In one embodiment, security service 124 applies preestablished security settings and policies to newly deployed virtual machines using security elements that provide information of a virtual machine and/or define a location of the virtual machine within an application hierarchy. In one embodiment, the processes disclosed herein are performed by security service 124. In other embodiments, the processes disclosed herein are performed by microservices (e.g., microservices 108-122) based on instructions from security service 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security service 124 comprises program code executing within a processor and may have interfaces (such as configuration or administration user interfaces) that are made available over a network to users. In a virtualized environment, the user may not be aware of the specific processor on which security service 124 is executing and, in some embodiments, that processor may change based on loading of the virtual environment. Such changes may occur based on administrator requests or automatically based on the virtual environment's control software.

In one embodiment, network security system 100 receives traffic via network interface 128 to/from a datacenter. In one embodiment, network security system 100 is placed in-line to inspect traffic, and potentially intercept a threat before it arrives at, or leaves, the datacenter. In other embodiments, network security system 100 monitors the traffic heading into, or out of, the datacenter, in which case network security system 100 detects threats and generates alerts but does not block the data. Hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In one embodiment, microservices 108-122 are implemented using computer-executable instructions loaded from the Internet via network interface 128. For instance, in one embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, network security system 100 runs on a datacenter computer. In other embodiments, however, network security system 100 is installed and runs on any one of a wide variety of computing platforms, ranging from low-cost to high-cost, and from low-power to high power. In some embodiments, network security system 100 runs on a server. In some embodiments, network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
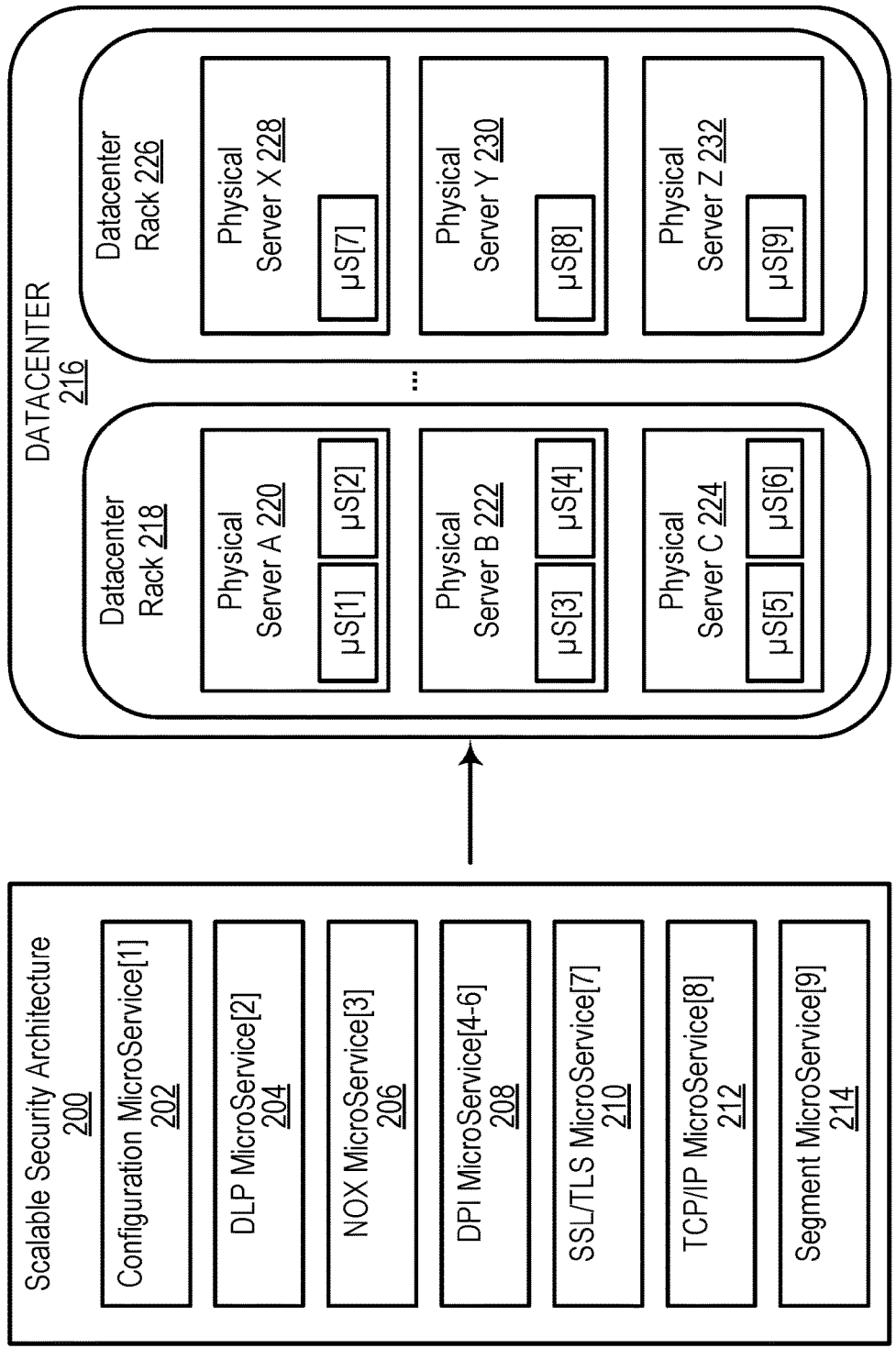
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy and configures them to communicate with each other via a backplane. The microservices, for example, may be implemented by physical servers in datacenter 330.

Figure 4:
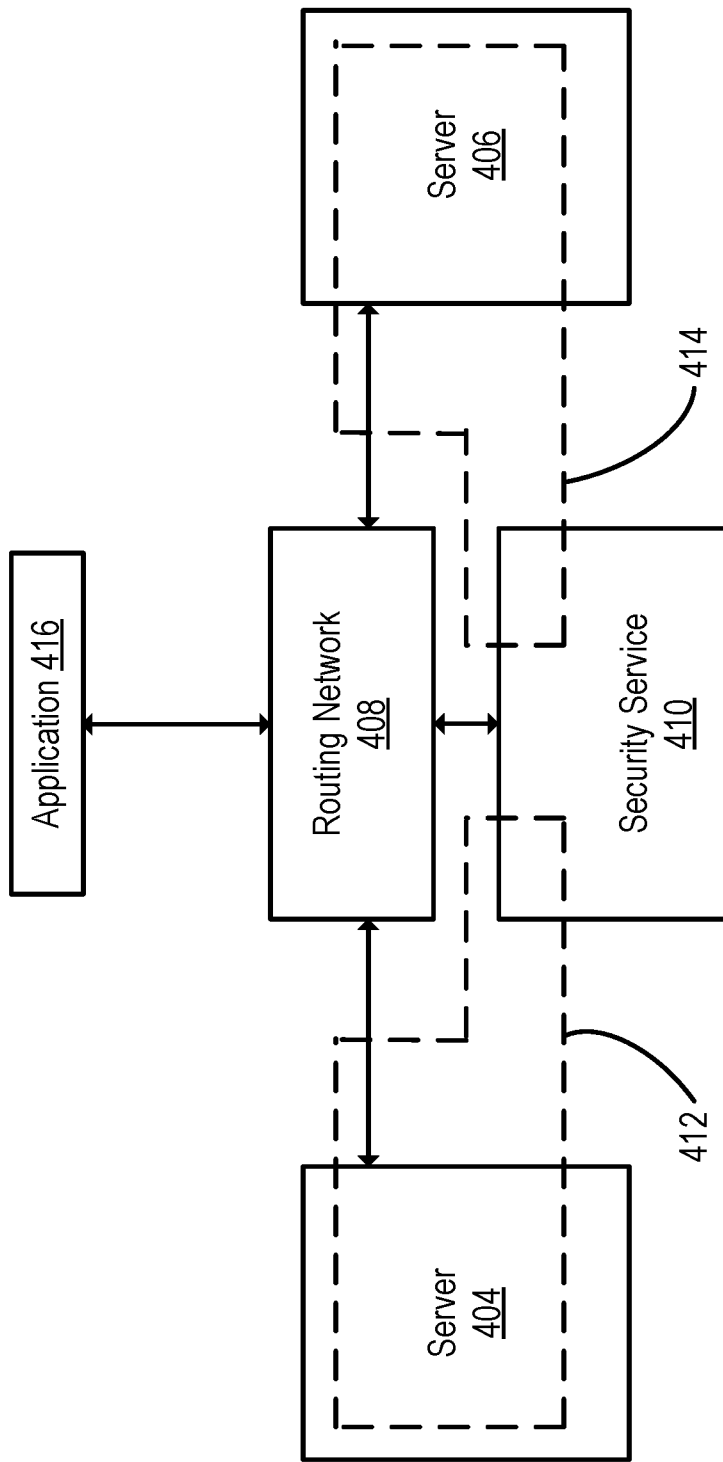
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between application 416 and one or more servers 404 and 406 through a routing network 408. In one embodiment, security service 410 is an example of security service 124 in FIG. 1. In one embodiment, security service 410 comprises one or more "microservices" (e.g., microservices 108-122 in FIG. 1) used to monitor and perform various actions relative to data items (e.g. network traffic, files, email messages, etc.) sent to and received from one or more applications 416 and servers 404 and 406. The microservices comprising security service 410 do not need to be confined to one physical server such as a server 404 and 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404 and 406, security service 410, and application 416 are deployed in a networked environment. Examples of networked environments include data centers, an on-premise stack, and a set of servers remotely connected using a network.

In one embodiment, a routing network 408 provides connectivity among servers 404 and 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
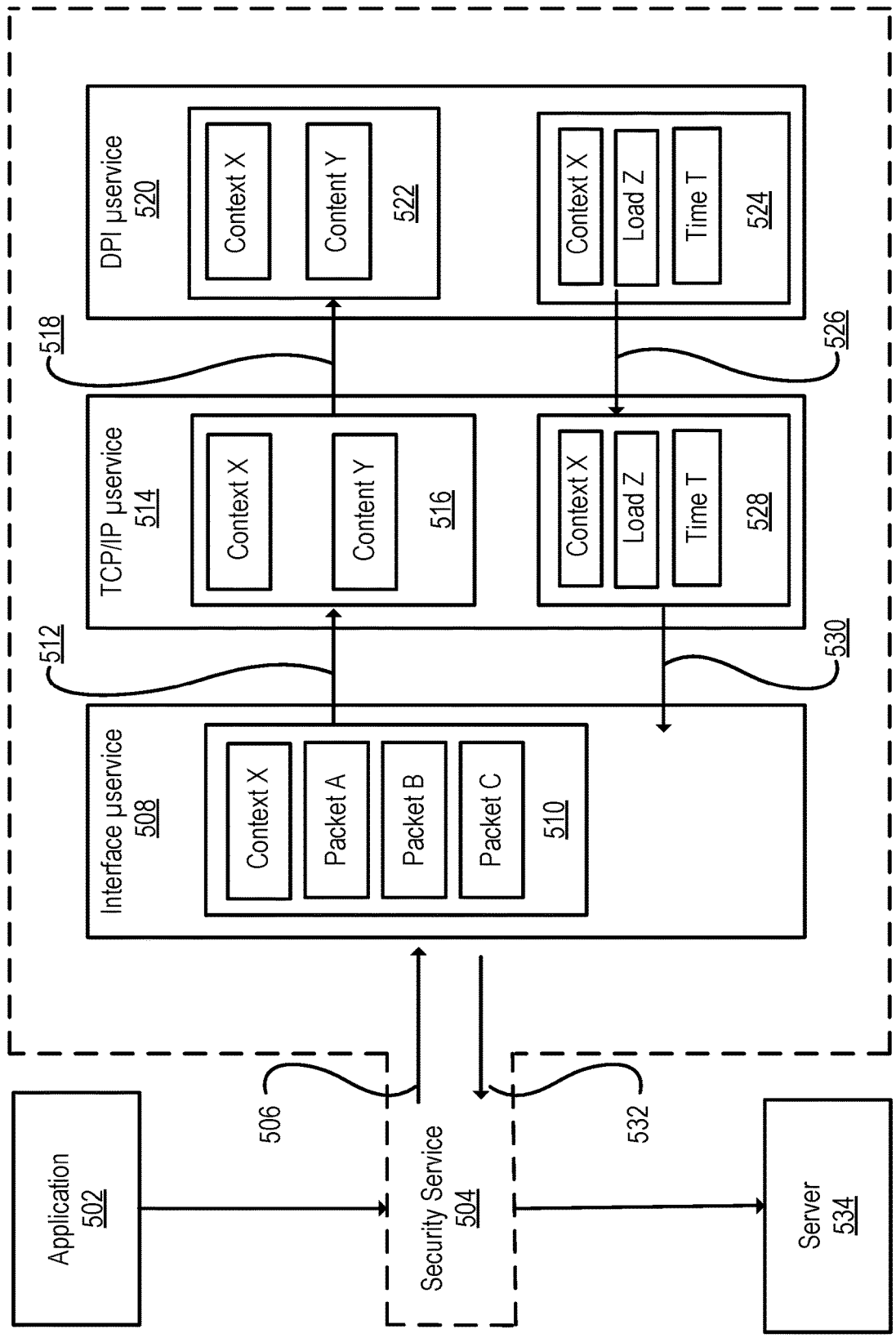
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network data packet from application 502. In one embodiment, security service 504 is an example of security service 124 in FIG. 1. Security service 504 receives the packet (e.g., from an application or program that redirects packets to security service 504), and security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via transmission paths 526 and 530, the microservices receive and can maintain real-time loading and processing latency information utilized to make load balancing decisions.

Figure 6:
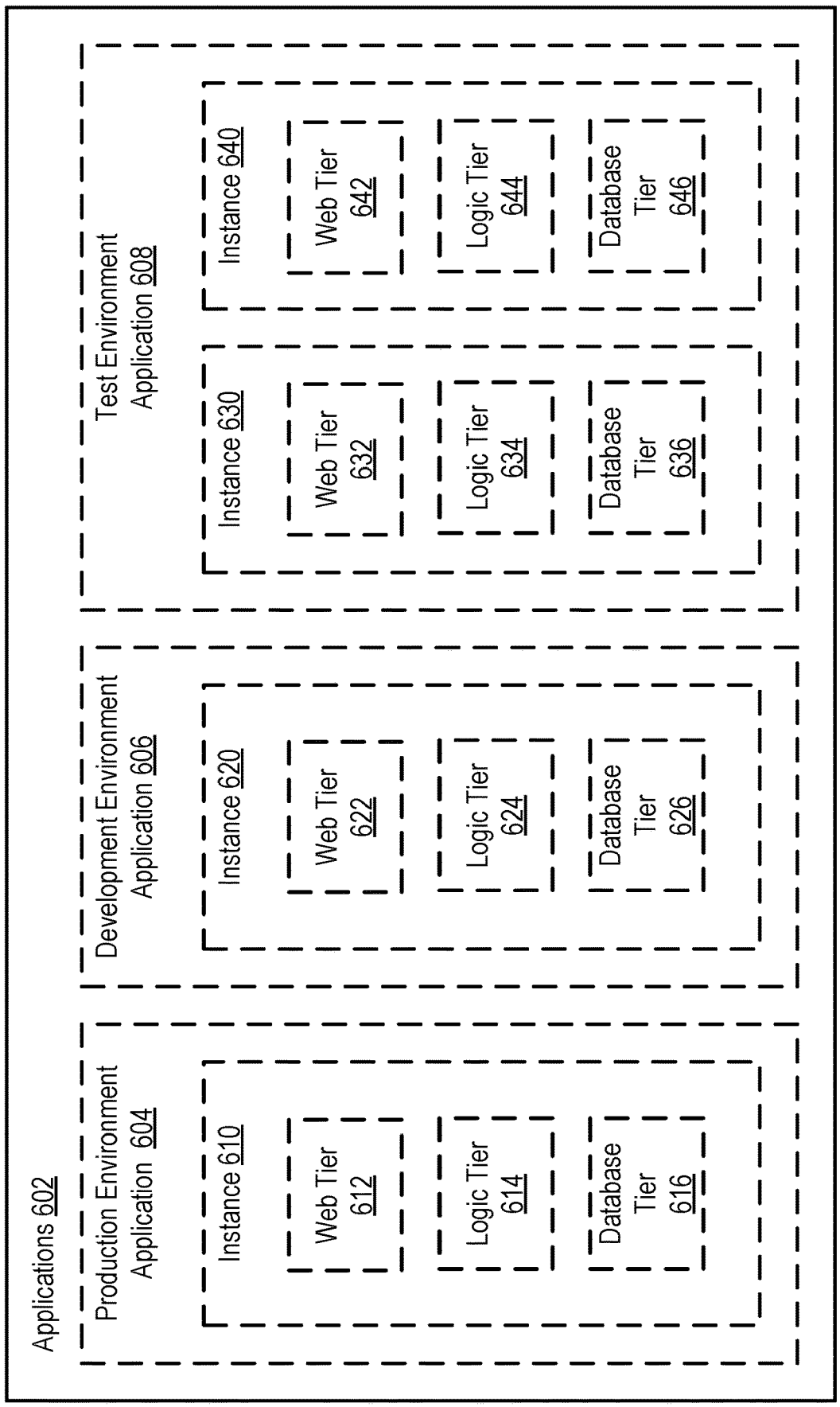
FIG. 6 is a block diagram illustrating an application for handling workloads in accordance with disclosed embodiments.

FIG. 6 is a block diagram illustrating an application for handling workloads in accordance with disclosed embodiments. In one embodiment, a workload can be a virtual machine (VM). In alternative embodiments, a workload can be a subset of applications or programs running within a virtual machine. As depicted in FIG. 6, applications 602 is an abstraction to indicate a grouping of related applications. For example, applications 602 includes three different environment applications: production environment application 604, development environment application 606, and test environment application 608. In one embodiment, production environment application 604 is a live version handling interactions with customers, development environment application 606 is a next future version of the application under development, and test environment application 608 is a snapshot of the next version of the application under development being tested for readiness to be moved into production environment applications 604. Test environment application 608 may include snapshots or copies of the current production environment such that any bugs or issues discovered in the (live) production environment can be recreated, characterized and addressed. Production environment application 604 includes instance 610, development environment application 606 includes instance 620, and test environment application 608 includes instance 630 and instance 640. In other embodiments, application 602 can include additional, fewer, or different environment applications.

In one embodiment, instances are the unit of an application that is started and stopped atomically. A desktop computer with multiple windows of Internet Explorer would be said to be running multiple instances of Internet Explorer with each instance including one or more tabs containing web pages. When an instance of Internet Explorer is stopped, all tabs within that instance are stopped.

As an example, where applications 602 includes different environment application for a ticketing application for an airline company, production environment application 604 has instance 610 that handles transactions with customers purchasing airline tickets, while instances in development environment application 606 and test environment application 608 are future versions of the ticketing application that are not live. In one embodiment, instance 620 in development environment application 606 is not required to be fully functional at all times. In one embodiment, instance 610 does not have debug and testability features. In an example, an instance in test environment application 608 is ready to replicate a bug identified in production environment application 604, another instance in test environment application 608 is testing a snapshot of an instance from development environment application 606, and/or another instance in test environment application 608 is testing a specific bug identified in a specific production environment for a specific customer. Each environment may be configured with the appropriate number of instances to support the architecture and requirements of the applications and the corresponding support and development environments.

Where applications 602 include web-based application, instance 610 includes web tier 612, logic tier 614, and database tier 616. Similarly, instance 620 includes web tier 622, logic tier 624, and database tier 626, instance 630 includes web tier 632, logic tier 634, and database tier 636, and 640 includes web tier 642, logic tier 644, and database tier 646. A web tier can include a web server interface that communicates with a user device to provide a web interface or API. A logic tier can include an application server interface where the application code is running. A database tier can include a database and/or an object store for information storage and/or interfaces to a database and/or an object store.

To ensure security and stability of applications 602, a security system does not allow elements within instance 610 to freely interact with instances in development environment application 606 and test environment application 608. For example, if a device in development environment application 606 is compromised, that device should not communicate or interact with production environment application 604, e.g., to prevent the spread of malware or malicious code. In contrast, a security system can grant logic tier 634 in test environment application 608 read-only access to database tier 616 in production environment application 604 in a testing scenario. Such exceptions to the sequestration of environments may be advantageous in testing new features or comparing the efficiencies of algorithms being developed or improved. For example, when developing (in a test environment) a fix for a bug (found in a production environment), it may be advantageous to provide read-only access to some data within the production environment in order to replicate the bug. In another example, a security system prevents a web tier within an instance to communicate directly with a database tier within the same instance to prevent the spread of malicious content from a web server to a database.

Figure 7:
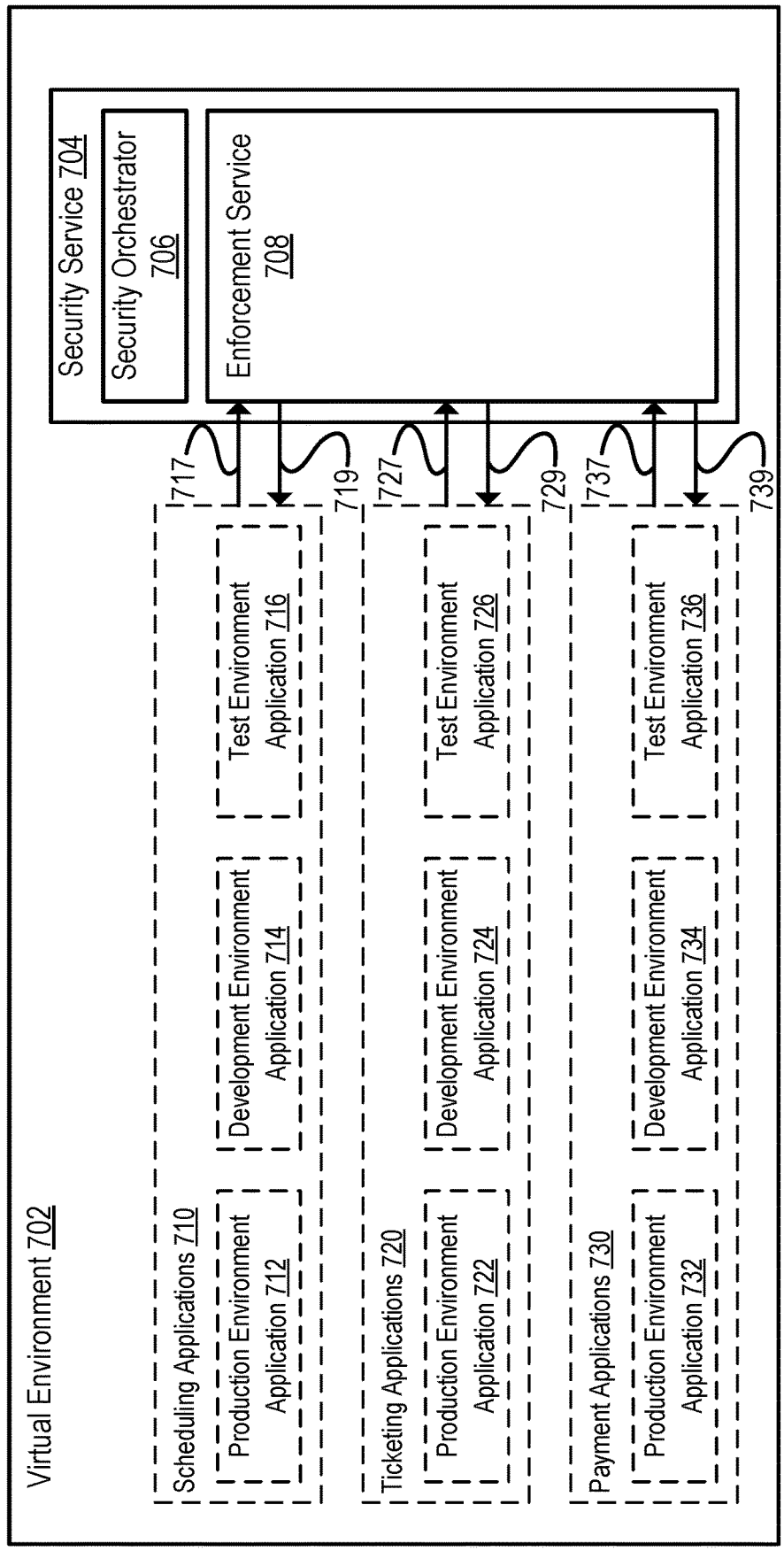
FIG. 7 is a block diagram illustrating the use of a security service to applications within a virtual environment in accordance with disclosed embodiments.

FIG. 7 is a block diagram illustrating the use of a security service to applications within a virtual environment in accordance with disclosed embodiments. In one embodiment, virtual environment 702 is hosted by a physical environment. Virtual environment 702 includes security service 704 that includes security orchestrator 706 and enforcement service 708. In one embodiment, one or more of security orchestrator 706 and enforcement service 708 are microservices (e.g., microservices 108-122 in FIG. 1) performing the embodiments disclosed herein based on instructions from security service 704. In one embodiment, security service 704 is an example of security service 124, depicted in FIG. 1. Security orchestrator 706 is configured to manage the evaluation of network traffic. Security orchestrator 706 comprises program code executing within a processor and may have interfaces (such as configuration or administration user interfaces) that are made available over a network to application owners and users or to security administrators.

In a virtual environment (e.g., virtual environment 702), the application owners and users may not be aware of the specific processor on which security orchestrator 706 is executing and, in some embodiments, that processor may change based on loading of the virtual environment. Such changes may occur based on administrator requests or automatically based on the virtual environment's control software. In one embodiment, virtual environment 702 and security service 704 are part of a networked environment, and network traffic between virtual environment 702 and security service 704 passes through a routing network (e.g., routing network 408 from FIG. 4).

As depicted in FIG. 7, example virtual environment 702 also includes multiple applications related to an airline company: scheduling applications 710, ticketing applications 720, and payment applications 730. As depicted in FIG. 7, scheduling applications 710, ticketing applications 720, and payment applications 730 are abstractions to indicate groupings of applications related to the same function. For example, each of scheduling applications 710, ticketing applications 720, and payment applications 730 include production environment applications (e.g., 712, 722, and 732, respectively), development environment applications (e.g., 714, 724, and 734, respectively), and test environment applications (e.g., 716, 726, and 736, respectively). In other embodiments, virtual environment 702 can include additional, fewer, or different applications.

Enforcement service 708 evaluates network traffic and determines whether a source of the network traffic has permission to communicate with the intended destination of the network traffic. For example, enforcement service 708 receives network traffic from one of the environment applications within scheduling applications 710 via communication path 717, from one of the environment applications within ticketing applications 720 via communication path 727, and/or from one of the environment applications within payment applications 730 via communication path 737. Enforcement service 708 determines whether the network traffic can be sent to its intended destination based on rules and profiles. After making its determination and determining that the source has permission to send network traffic to the intended destination, enforcement service 708 sends network traffic to one of the environment applications within scheduling applications 710 via communication path 719, to one of the environment applications within ticketing applications 720 via communication path 729, and to one of the environment applications within payment applications 730 via communication path 739. When enforcement service 708 determines that the source of the network traffic does not have permission to communicate or interact with the intended destination, enforcement service 708 blocks or otherwise prevents the network traffic from being sent to the intended destination.

In one embodiment, enforcement service 708 handles both intra-application traffic and inter-application traffic. For example, the traffic sent from one of the scheduling applications 710 to enforcement service 708 via communication path 717 can be from production environment 712 to development environment 714 and/or test environment 716, and/or from production environment 712 to one or more environments in ticketing applications 720 and payment applications 730.

Figure 8:
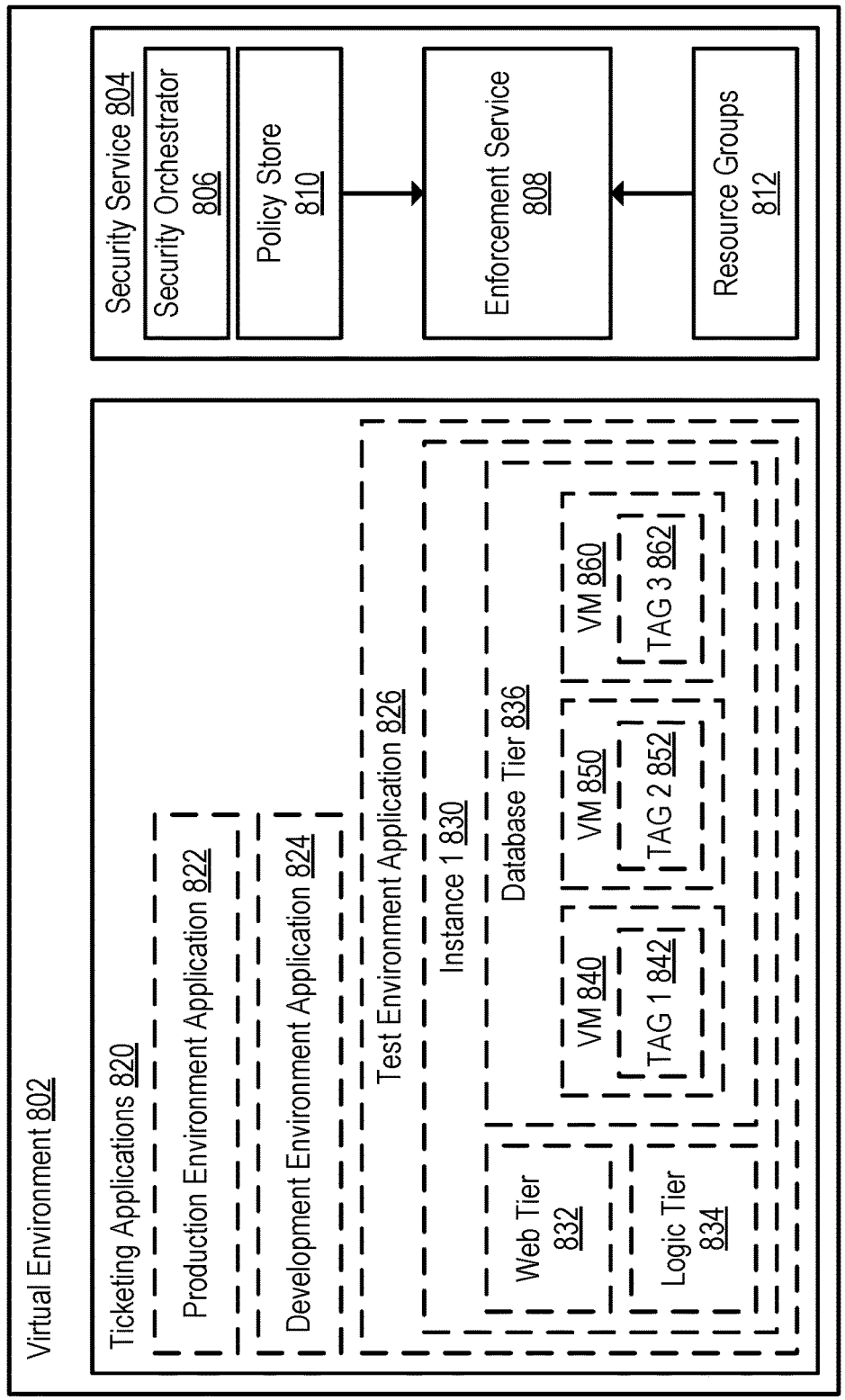
FIG. 8 is a block diagram illustrating a class hierarchy of elements within an application in accordance with disclosed embodiments.

FIG. 8 is a block diagram illustrating a class hierarchy of elements within an application in accordance with disclosed embodiments. Virtual environment 802 includes ticketing applications 820 and security service 804. In one embodiment, security service 804 is an example of security service 124, depicted in FIG. 1. Security service 804 includes security orchestrator 806, enforcement service 808, policy store 810, and resource group 812. In one embodiment, one or all of security orchestrator 806, enforcement service 808, policy store 810, and resource group 812 are microservices (e.g., microservices 108-122 in FIG. 1) performing the embodiments disclosed herein based on instructions from security service 804. In one embodiment, virtual environment 802 and security service 804 are part of a networked environment, and network traffic between virtual environment 802 and security service 804 passes through a routing network (e.g., routing network 408 from FIG. 4).

In one embodiment, virtual machines that are assigned the same, or similar, permissions or policies are defined as a resource group. Resources groups 812 stores the associations and members of each resource group, and policy store 810 stores the policies and permissions associated with each resource group.

As depicted in FIG. 8, ticketing applications 820 is an abstraction to indicate a grouping of related applications operating in virtual environment 802, and includes production environment application 822, development environment application 824, and test environment application 826. Test environment application 826 includes at least one instance (e.g., instance 1 830) comprised of web tier 832, logic tier 834, and database tier 836, which can provide APIs or interfaces to web servers, application servers, and/or databases or object stores. Database tier 836 includes multiple workloads, e.g., VMs 840, 850, and 860. Each of VMs 840, 850, and 860 is associated with a tag: tag 1 842 for VM 840, tag 2 852 for VM 850, and tag 3 862 for VM 860. In one deployment, VMs 840, 850, and 860 execute within a virtual chassis (e.g., virtual chassis 106 in FIG. 1). Although not depicted in FIG. 8, production environment application 822 and development environment application 824 can have similar hierarchies. Tags may be considered metadata that can be applied to objects within a virtualized system. Such metadata may be composed of keyword-value pairs. An example of tags within VMWare virtualized environments invention includes assigning a "Windows", "Linux" or "Mac OS" value to the keyword "Operating System" for each virtual machine under vSphere control (also called the "vSphere inventory".

In one embodiment, a tag stores various information (e.g., security elements) for the corresponding workload, such as application information, environment information, instance information, and tier information. In one embodiment, the security elements are stored as key-value pairs. In other embodiments, the information can be stored in fields within a tag. In one embodiment, security service 806 identifies the existence of a tag and detects the presence of keywords relevant to security parameters and applies any corresponding security settings and policies. Security settings and policies can include policies to apply to a virtual machine upon instantiation and/or policies to apply following instantiation, including for processing of network traffic associated with the virtual machine. In some embodiments, each individual security settings and policies can be referred to as a policy or a security policy.

In one embodiment, a security element is an abstraction. For example, a metadata abstraction may use the abstracted form "Application=Seattle Devops" to refer to one or more applications within the Seattle datacenter and the one or more environments corresponding to development and operations environments. Security service 804 recognizes the tag component (security element keyword "Application") with value "Seattle Devops" and performs a substitution for the metadata "Seattle Devops" using the one or more applications and one or more environments. The substitution may be controlled through configuration of security service 804 and may originate from the user in a manner similar to macro definition and substitution. In another example, using FIG. 7, "a metadata abstraction may use the abstracted form Application=Airline Apps" to refer to one or more of environment applications in scheduling applications 710, ticketing applications 720, and payment applications 730.

Figure 9:
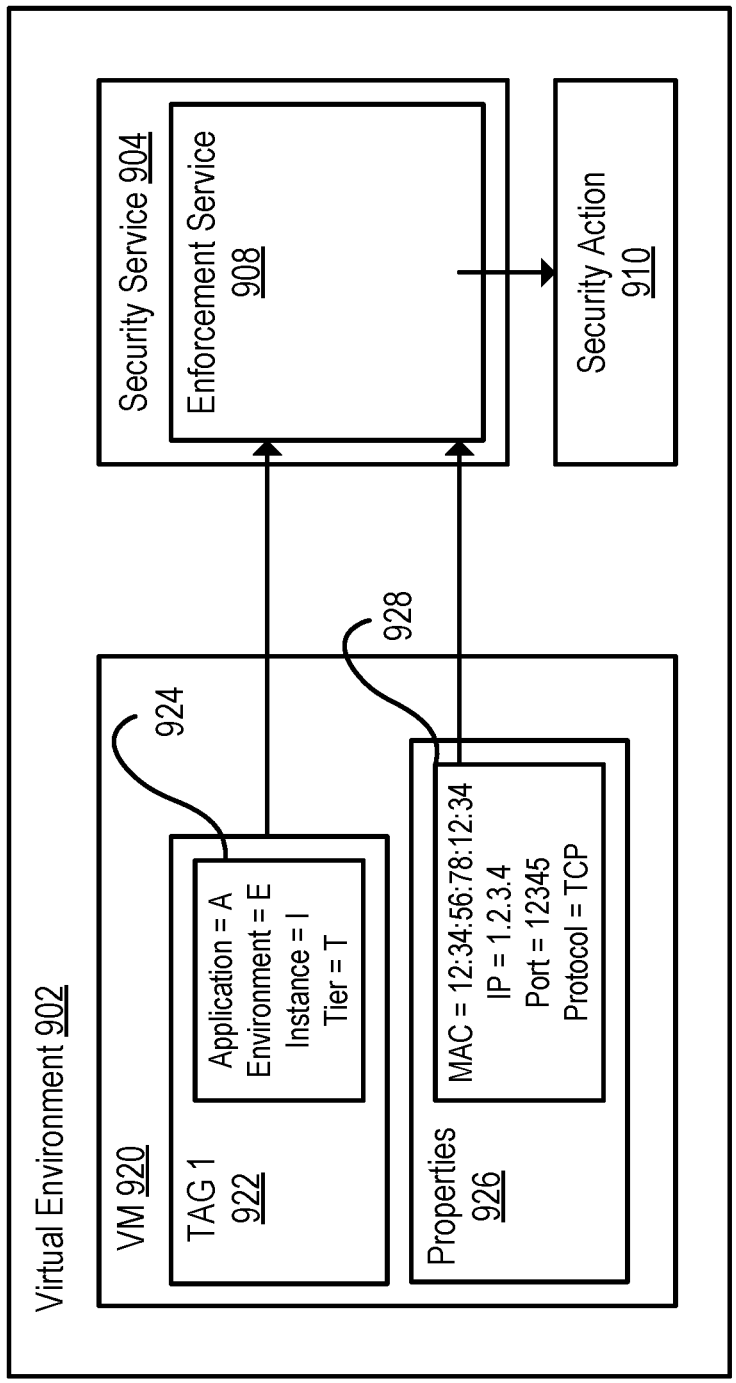
FIG. 9 is a block diagram illustrating elements of a tag for a workload within an application in accordance with disclosed embodiments.

FIG. 9 is a block diagram illustrating elements of a tag for a workload within an application in accordance with disclosed embodiments. FIG. 9 includes virtual environment 902, which includes VM 920 and security service 904. In one embodiment, security service 904 is an example of security service 124, depicted in FIG. 1. Security service 904 includes enforcement service 908. In one embodiment, enforcement service 908 is a microservice (e.g., microservices 108-122 in FIG. 1) performing the application or assignment of security settings and policies based on the security elements received from a virtual machine. In one embodiment, enforcement service 908 performs these functions based on instructions from security service 904. In one embodiment, virtual environment 902 and security service 904 are part of a networked environment, and network traffic between virtual environment 902 and security service 904 passes through a routing network (e.g., routing network 408 from FIG. 4).

Although not depicted, 920 can be part of an application hierarchy. For example, VM 920 is in a hierarchy consisting of an application, an environment, an instance, and a tier. Correspondingly, tag 1 922 includes tag values/properties 924, where tag values 924 includes multiple security elements key-value pairs identifying the components of the hierarchy in which 920 resides. The example in FIG. 9 includes the following security elements key-value pairs: "Application=A," "Environment=E," "Instance=I," and "Tier=T," where the value of each is an identifier for a component corresponding to that class type within the application hierarchy. Other examples can include additional, fewer, and/or different security elements key-value pairs. Using the security elements key-value pairs, security settings and policies can be defined and applied to a workload (e.g., a virtual machine) regardless of how the workload is connected, the physical machine the workload is operating on, and any changes to a network environment. For example, security settings and policies may be assigned to govern the relationship between production and development environments for a particular application. A security orchestrator can automatically apply a specific set of security settings and policies to a group of virtual machines tagged with the security elements "Environment" and "Application" regardless of the underlying network parameters that may change over time. If the policy allows such inter-environment communication only over port 3306 (MySQL), the security orchestrator can apply an access control restricting traffic between the IP addresses of the virtual machines of the particular application in the two environments to port 3306 without the application owner or users requiring the knowledge of IP addresses or locations of any virtual machines. The nature of the access control (IP-based, routing based, vlan based, etc.) is opaque to the application owner or users.

Returning to FIG. 8, tag 1 842 can store: "Application=Ticketing," "Environment=Test," "Instance=1," and "Tier=Database." In the example depicted in FIG. 8, Tag 2 852 and tag 3 862 store the same information as tag 1 842. The information in a tag can be formatted as in the example above, or in another format, e.g., as a sequential sequence of identifiers ("A.E.I.T") or as separate key-value pairs ("Application:A", "Environment:E", etc.).

In one embodiment, security service 904 receives the tag properties (e.g., 924) of a tag (e.g., tag 1 922) when VM 920 is launched, e.g., via a notification or through a virtual machine discovery process. Subsequently, enforcement service 908 in security service 904 receives network traffic from 920 and the tag properties 924 in tag 1 922 of VM 920. Based on evaluating the identifiers in tag properties 924, enforcement service 908 locates and applies security action 910 based. Security action 910 can include enforcing security settings and policies on the network properties 926 of the network traffic or the content of the network traffic. Network properties include a MAC address (e.g., 12:34:56:78:12:34), an IP address (e.g., 1.2.3.4), a port (e.g., 12345), and a protocol (e.g., TCP), as depicted in 928, and are the properties of the network traffic from VM 920. Security action 910 may also include configuration elements necessary to fully execute the security action. For example, if the security action specifies performing content inspection of all database traffic, it may be necessary as part of such action to install and configure a segment interface to allow inspection of the traffic, spawn microservices to perform TCP reassembly and content inspection, initialize rules and schemas for pattern matching engines or other actions. In the embodiment depicted in properties 928 up through layer 4. In other embodiments, properties 928 include additional layer 4-7 content (e.g., content inspect, DLP, etc.). For example, properties 928 can include content inspection, data leakage protection, etc.

Figure 10:
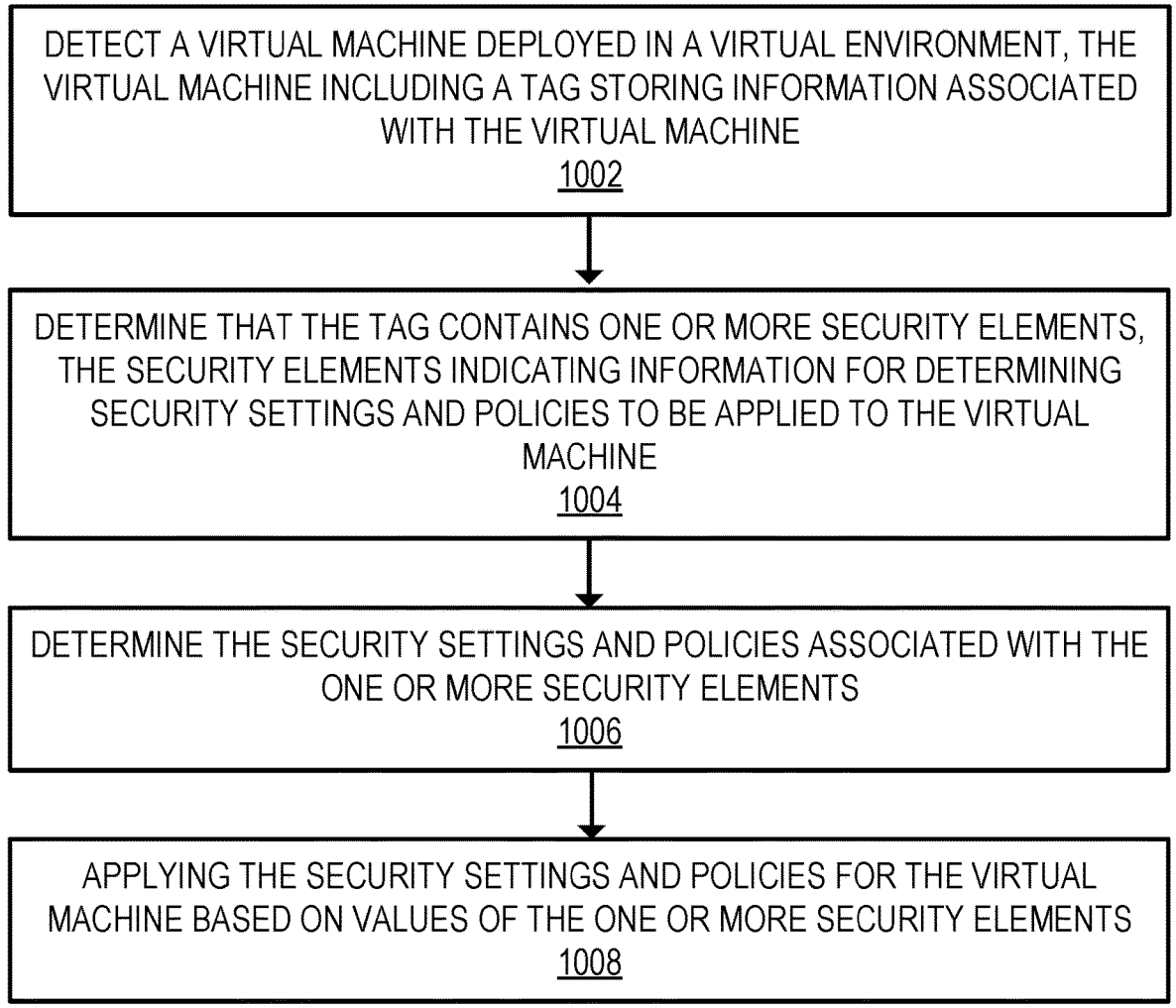
FIG. 10 is a flow diagram illustrating a process for dynamically applying application security settings and policies based on workload properties in accordance with an embodiment.

FIG. 10 is a flow diagram illustrating a process for dynamically generating application security settings and policies based on workload properties in accordance with an embodiment. For ease of understanding, the description of FIG. 10 below references components of the networked environments of FIGS. 1, 8 and 9, however, it is not limited to those components. In one embodiment, a security orchestrator (e.g., security orchestrator 806 in FIG. 8) performs the actions described below. In one embodiment, the security orchestrator receives instruction to perform the actions described below, e.g., by a security service on which the security orchestrator is located. In another embodiment, security orchestrator 806 is located on security service 804 in FIG. 8. In one embodiment, security service 804 is an example of security service 124, depicted in FIG. 1. In other embodiments, a management microservice (e.g., microservice 108-122) receives instructions to perform the actions described below. Further, the actions below may be performed by one or more security microservices at the direction of a management microservice. As such, a single security microservice may perform an action, or two more security services may perform the action either independently, or in conjunction. Although FIG. 10 describes operations performed by a management microservice, some or all of the operations described in FIG. 10 can be performed by a configuration microservice, another type of microservice, an application, or any other computer-executable logic.

At block 1002, a security orchestrator (e.g., security orchestrator 806) detects a workload deployed in a virtual environment. The workload can be a virtual machine, or applications and processes running within a virtual machine. The virtual machine can be deployed within an application running within the virtual environment. In the example of FIG. 8, security orchestrator 806 detects the deployments of VM 860 within ticketing application 820 in virtual environment 802. In another example, security orchestrator 806 receives a notification from the hypervisor regarding the deployment of VM 860.

In one embodiment, the security orchestrator identifies a tag associated with the virtual machine. Continuing the example of FIG. 8, security orchestrator 806 receives tag 3 862 corresponding to the detected VM 860.

At block 1004, the security orchestrator determines that the tag associated with the virtual machine contains one or more security elements. The tag can include a plurality of security elements and a plurality of non-security elements. In one embodiment, the security elements indicate information for determining security settings and policies to be applied to the virtual machine. In one embodiment, a security element is a tag element which may be used to impact security settings and policies through inclusion in a rule, configuration or other control structure, and a non-security element is any tag element that has no impact on the security orchestrator under any configuration. In one embodiment, the tag can be composed of a set of key-value pairs, where each key-value pair represents a security element or a non-security element. In another embodiment, the tag can be composed of metadata representing an abstraction or aggregation of tag properties. In one embodiment, the security orchestrator evaluates the set of key-values pairs representing security elements to identify keys and their corresponding values. In one embodiment, the relevant key-value pairs represent hierarchical security elements that indicate the virtual machines position within an application hierarchy. In the example of FIG. 9, a security orchestrator associated with security service 904 identifies key-value pairs for "Application," "Environment," "Instance," and "Tier" from tag 1922. Where these key-value pairs represent hierarchical security elements, they indicate the position of VM 920 within an application (not pictured).

At block 1006, the security orchestrator determines security settings and policies associated with the one or more security elements based on values of the one or more security elements. The security settings and policies indicate a security configuration and initial setup for the virtual machine (e.g., policies to apply upon instantiation of the virtual machine). For example, security settings and policies can include verifying that there is an interface microservice on the virtual machine, establishing an interface microservice when there is not one on the virtual machine, configuring a capture interface to capture and inspect all network traffic from the virtual machine, configuring a capture interface to capture and inspect all network traffic from a specified port, inspect through TCP but do not perform TCP reassembly, perform full reassembly and content inspection, etc. The security settings and policies can also indicate how the security orchestrator is to handle network traffic received from the virtual machine (e.g., policies to apply after instantiation of the virtual machine). For example, security settings and policies indicate when to block a packet, how and where network traffic should be routed, etc.

In one embodiment, the security orchestrator identifies the values of each security element of the one or more security elements in the tag, and accesses a policy store (e.g., policy store 810) to determine the security settings and policies based on at least one of the identified values. For example, given VM 860 in FIG. 8, tag 3 862 indicates the following security elements and properties: "Application=Ticketing," "Environment=Test," "Instance=1" and "Tier=Database." Given these identified security elements, security orchestrator 806 applies established security settings and policies (e.g., only allow network traffic on port 3306) that applies to workloads operating in a database tier within an instance in a test environment.

Using the example depicted in FIG. 8, example security settings and policies are described below. For example, a policy to allow logic tier 834 to communicate with database tier 836, e.g., on MySQL port TCP 3306) and inspect the allowed traffic with the database policy can be represented as shown below. Security orchestrator creates two resource groups based on the following policy: one containing workloads (e.g., virtual machines) tagged with "Tier:Logic" and one containing workloads tagged as "Tier:Database." Security orchestrator also creates an access control list to allow TCP traffic with source port "ANY" and destination port "3306" between the two resource groups and uses the Database Policy to inspect the allowed TCP traffic.

ALLOW TCP Tier:Logic ANY to Tier:Database
3306 Policy:DatabasePolicy

While the previous exemplary policy allows the logic tier and the database tier within a single application, it also allows a logic tier of a first application to communicate with the database tier of a second application. To prevent this, a scoped policy can be used. Using the example depicted in FIG. 8, a policy to allow logic tier 834 to communicate with database tier 834 only if the application environment and instance match can be represented as shown below:

ALLOW TCP Tier:Logic ANY to Tier:Database
3306 Policy:DatabasePolicy Scope:{Application, Environment, Instance}

In another example, a scoped policy can include a context-based scope definition, represented as shown below. In response to this policy, security orchestrator 806 generates an access control list only for ticketing application 820.

ALLOW TCP Tier:Logic ANY to Tier:Database
3306 Policy:DatabasePolicy
Scope:{Application:{Ticketing}, Environment, Instance}

In one embodiment, security orchestrator 806 utilizes macro definitions to define elements within the policy. For example, the macro definition "#define Application=[Ticketing, Flight Schedules]" defines two Applications: Ticketing and Flight Schedules. As another example, the macro definition "#define Application=[Production, Development, Test]" defines three Environments: Production, Development, Test.

At block 1008, the security orchestrator applies the determined security settings and policies to the virtual machine. Thus, the security orchestrator dynamically applies security settings and policies to the virtual machine that can be applied to or enforced upon network traffic from virtual machines, or other types of workloads. As shown in the example security settings and policies, the security orchestrator can apply the security settings and policies without the application owner or users having to know details about specific virtual machines, including where the virtual machine is located (e.g., what hardware), how the virtual machine is connected, etc. Policies can be implemented based on the intent of that application owner or users with that intent being maintained in the presence of an evolving infrastructure.

Subsequently, when the security orchestrator receives network traffic from the virtual machine, the security orchestrator applies the security settings and policies for the virtual machine. In one embodiment, the security orchestrator analyzes the tag with the network traffic and based on the tag properties, identifies the security settings and policies associated with the virtual machine. In one embodiment, an enforcement service (e.g., enforcement service 808) applies a security action on the network traffic based on the identified security settings and policies. Security actions can include performing an inspection of the content of the network traffic, blocking or otherwise preventing the network traffic from the virtual machine from being sent to the intended destination, blocking network traffic directed back to the virtual machine, configuring a microservice to perform security processing, transmitting the network traffic to a particular destination and/or via a specific port, etc. In one embodiment, applying a security action can include operating as a pass-through for network traffic that does not require content inspection.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

FIG. 11 is a block diagram that illustrates a computer system 1100 utilized in implementing the above-described techniques in accordance with some of the disclosed embodiments. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more buses 1102 or other communication mechanism for communicating information, and one or more hardware processors 1104 coupled with buses 1102 for processing information. Hardware processors 1104 may be, for example, general purpose microprocessors. Buses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random-access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In one embodiment, any suitable type of output device, such as, for instance, an audio speaker or printer, may be utilized instead of a display 1112.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In one embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in one embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As another example, the one or more communication interfaces 1118 may include a wireless network interface controller, such as an 802.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a Service Provider 1126. Service Provider 1126, which may for example be an Internet Service Provider (ISP), in turn provides data communication services through a wide area network, such as the world-wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In one embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

In one embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In one embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In one embodiment, the cloud-based components may be implemented by third-party entities, on behalf of another entity for whom the components are deployed. In other embodiments, however, the described systems may be implemented entirely by computer systems owned and operated by a single entity.

In one embodiment, an apparatus comprises a processor and is configured to perform any of the foregoing methods. In one embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: detecting a virtual machine deployed in a virtual environment, the virtual machine including a tag storing information associated with the virtual machine. The method further comprises determining whether the tag contains one or more security elements, the security elements indicating information for determining security settings and policies to be applied to the virtual machine. The method further comprises determining the security settings and policies associated with the one or more security elements. The method further comprises applying the security settings and policies for the virtual machine based on values of the one or more security elements.

In some embodiments, one or more of the following applies: 1) determining the security settings and policies associated with the one or more security elements further comprises: identifying values of each security element of the one or more security elements, and accessing a policy store to determine the security settings and policies based on at least one of the identified values; 2) the method further comprises: receiving network traffic from the virtual machine, and applying a security action to the received network traffic from the virtual machine; 3) the security action includes applying the security settings and policies to block the received network traffic from the virtual machine from being sent; 4) the security action includes configuring a microservice to perform security processing; 5) metadata is used to abstract the values of the security elements; 6) the method further comprises: receiving network traffic from the virtual machine, and applying a security action to traffic directed to the virtual machine; 7) the security elements are hierarchical security elements; and 8) the security settings and policies includes configuring a capture interface to inspect network traffic received from the virtual machine.

In some embodiments, one or more non-transitory computer-readable storage media store instructions which, when executed by one or more hardware processors, cause performance of a method comprising: detecting a virtual machine deployed in a virtual environment, the virtual machine including a tag storing information associated with the virtual machine. The method further comprises determining whether the tag contains one or more security elements, the security elements indicating information for determining security settings and policies to be applied to the virtual machine. The method further comprises determining the security settings and policies associated with the one or more security elements. The method further comprises applying the security settings and policies for the virtual machine based on values of the one or more security elements.

In some embodiments, one or more of the following applies: 1) determining the security settings and policies associated with the one or more security elements further comprises: identifying values of each security element of the one or more security elements, and accessing a policy store to determine the security settings and policies based on at least one of the identified values; 2) the method further comprises: receiving network traffic from the virtual machine, and applying a security action to the received network traffic from the virtual machine; 3) the security action includes applying the security settings and policies to block the received network traffic from the virtual machine from being sent; 4) the security action includes configuring a microservice to perform security processing; 5) metadata is used to abstract the values of the security elements; 6) the method further comprises: receiving network traffic from the virtual machine, and applying a security action to traffic directed to the virtual machine; 7) the security elements are hierarchical security elements; and 8) the security settings and policies includes configuring a capture interface to inspect network traffic received from the virtual machine.

In some embodiments, an apparatus comprises: one or more hardware processors; and memory coupled to the one or more hardware processors, the memory storing instructions which, when executed by the one or more hardware processors, cause the apparatus to: detect a virtual machine deployed in a virtual environment, the virtual machine including a tag storing information associated with the virtual machine. The instructions further cause the apparatus to determine whether the tag contains one or more security elements, the security elements indicating information for determining security settings and policies to be applied to the virtual machine. The instructions further cause the apparatus to determine the security settings and policies associated with the one or more security elements. The instructions further cause the apparatus to apply the security settings and policies for the virtual machine based on values of the one or more security elements.

In some embodiments, one or more of the following applies: 1) determining the security settings and policies associated with the one or more security elements further comprises: identifying values of each security element of the one or more security elements, and accessing a policy store to determine the security settings and policies based on at least one of the identified values; 2) the instructions further cause the apparatus to receive network traffic from the virtual machine, and apply a security action to the received network traffic from the virtual machine; 3) the security action includes applying security settings and policies to block the received network traffic from the virtual machine from being sent; 4) the security action includes configuring a microservice to perform security processing; 5) metadata is used to abstract the values of the security elements; 6) the instructions further cause the apparatus to receive network traffic from the virtual machine, and apply a security action to traffic directed to the virtual machine; 7) the security elements are hierarchical security elements; and 8) the security settings and policies includes configuring a capture interface to inspect network traffic received from the virtual machine.

What is claimed is:

1. A computer-implemented method comprising:
   detecting a virtual machine deployed in a virtual environment, the virtual machine including a tag storing information associated with the virtual machine;
   determining the tag contains one or more security elements, the security elements indicating information for determining security settings and policies to be applied to the virtual machine, and wherein the security elements are hierarchical security elements;
   determining the security settings and policies associated with the one or more security elements; and
   applying the security settings and policies for the virtual machine based on values of the one or more security elements.

2. The computer-implemented method of claim 1, wherein determining the security settings and policies associated with the one or more security elements further comprises:
   identifying values of each security element of the one or more security elements; and
   accessing a policy store to determine the security settings and policies based on at least one of the identified values.

3. The computer-implemented method of claim 1, further comprising:
   receiving network traffic from the virtual machine; and
   applying a security action to the received network traffic from the virtual machine.

4. The computer-implemented method of claim 3, wherein the security action includes applying the security settings and policies to block the received network traffic from the virtual machine from being sent.

5. The computer-implemented method of claim 3, wherein the security action includes configuring a microservice to perform security processing.

6. The computer-implemented method of claim 1, wherein metadata is used to abstract the values of the security elements.

7. The computer-implemented method of claim 1, further comprising:
   receiving network traffic from the virtual machine;
   applying a security action to traffic directed to the virtual machine.

8. The computer-implemented method of claim 1, wherein the security settings and policies includes configuring a capture interface to inspect network traffic received from the virtual machine.

9. One or more non-transitory computer-readable storage media storing instructions which, when executed by one or more hardware processors, cause performance of a method comprising:
   detecting a virtual machine deployed in a virtual environment, the virtual machine including a tag storing information associated with the virtual machine;
   determining whether the tag contains one or more security elements, the security elements indicating information for determining security settings and policies to be applied to the virtual machine, and wherein the security elements are hierarchical security elements;
determining the security settings and policies associated with the one or more security elements; and
applying the security settings and policies for the virtual machine based on values of the one or more security elements.

10. The one or more non-transitory computer-readable storage media of claim 9, wherein determining the security settings and policies associated with the one or more security elements further comprises:
identifying values of each security element of the one or more security elements; and
accessing a policy store to determine the security settings and policies based on at least one of the identified values.

11. The one or more non-transitory computer-readable storage media of claim 9, further comprising:
receiving network traffic from the virtual machine; and
applying a security action to the received network traffic from the virtual machine.

12. The one or more non-transitory computer-readable storage media of claim 11, wherein the security action includes applying the security settings and policies to block the received network traffic from the virtual machine from being sent.

13. The one or more non-transitory computer-readable storage media of claim 11, wherein the security action includes configuring a microservice to perform security processing.

14. The one or more non-transitory computer-readable storage media of claim 9, wherein metadata is used to abstract the values of the security elements.

15. The one or more non-transitory computer-readable storage media of claim 9, further comprising:
receiving network traffic from the virtual machine; and
applying a security action to traffic directed to the virtual machine.

16. The one or more non-transitory computer-readable storage media of claim 9, wherein the security settings and policies includes configuring a capture interface to inspect network traffic received from the virtual machine.

17. An apparatus comprising:
one or more hardware processors;
memory coupled to the one or more hardware processors, the memory storing instructions which, when executed by the one or more hardware processors, causes the apparatus to:
detect a virtual machine deployed in a virtual environment, the virtual machine including a tag storing information associated with the virtual machine;
determine whether the tag contains one or more security elements, the security elements indicating information for determining security settings and policies to be applied to the virtual machine, and wherein the security elements are hierarchical security elements;
determine the security settings and policies associated with the one or more security elements; and
apply the security settings and policies for the virtual machine based on values of the one or more security elements.

18. The apparatus of claim 17, wherein determining the security settings and policies associated with the one or more security elements further causes the apparatus to:
identify values of each security element of the one or more security elements; and
access a policy store to determine the security settings and policies based on at least one of the identified values.

19. The apparatus of claim 17, wherein the instructions further causes the apparatus to:
receive network traffic from the virtual machine; and
apply a security action to the received network traffic from the virtual machine.

20. The apparatus of claim 19, wherein the security action includes applying the security settings and policies to block the received network traffic from the virtual machine from being sent.

21. The apparatus of claim 19, wherein the security action includes configuring a microservice to perform security processing.

22. The apparatus of claim 17, metadata is used to abstract the values of the security elements.

23. The apparatus of claim 17, wherein the instructions further causes the apparatus to:
receive network traffic from the virtual machine; and
apply a security action to traffic directed to the virtual machine.

24. The apparatus of claim 17, wherein the security settings and policies includes configuring a capture interface to inspect network traffic received from the virtual machine.

\* \* \* \* \*